United States Patent
Worstell et al.

(10) Patent No.: US 6,828,564 B2
(45) Date of Patent: Dec. 7, 2004

(54) DISTRIBUTED COINCIDENCE PROCESSOR

(75) Inventors: William A. Worstell, Wayland, MA (US); David M. Lazuka, Bolton, MA (US)

(73) Assignee: PhotoDetection Systems, Inc., Acton, MA (US)

(*) Notice: Subject to any disclaimer, the term of this patent is extended or adjusted under 35 U.S.C. 154(b) by 188 days.

(21) Appl. No.: 10/190,741

(22) Filed: Jul. 8, 2002

(65) Prior Publication Data

US 2004/0004191 A1 Jan. 8, 2004

(51) Int. Cl.[7] .................................. G01T 1/164
(52) U.S. Cl. ........................ 250/394; 250/363.03
(58) Field of Search ...................... 250/363.03, 394

(56) References Cited

U.S. PATENT DOCUMENTS

| | | | |
|---|---|---|---|
| 4,284,890 A | 8/1981 | Thompson | 250/363 |
| 4,395,635 A | 7/1983 | Friauf et al. | |
| 5,241,181 A | 8/1993 | Mertens et al. | 250/363.03 |
| 5,395,635 A | 3/1995 | Yanamoto et al. | 426/331 |
| 5,741,056 A | 4/1998 | Liu | 353/56 |
| 5,742,056 A | 4/1998 | Valentino et al. | |
| 5,793,045 A | 8/1998 | DiFilippo et al. | 250/363.03 |
| 5,937,202 A | 8/1999 | Crosetto | 395/800.19 |
| 6,057,551 A | 5/2000 | Tararine | |
| 6,072,177 A | 6/2000 | McCroskey et al. | 250/252.1 |
| 6,255,655 B1 | 7/2001 | Mc Croskey et al. | |

FOREIGN PATENT DOCUMENTS

| | | | | |
|---|---|---|---|---|
| GB | 2 052 207 A | | 1/1981 | |
| JP | 58-14071 A | * | 1/1983 | G01T/1/161 |
| JP | 58-14072 A | * | 1/1983 | G01T/1/161 |
| JP | 62-212588 A | * | 9/1987 | G01T/1/161 |

OTHER PUBLICATIONS

D.F. Newport, H.M. Dent, M.E. Casey and D.W. Bouldin, "Coincidence Detection and Selection in Positron Emission Tomography Using VLSI", IEEE: Transactions of Nuclear Science. vol. 36, No. 1, Feb. 1989.

* cited by examiner

Primary Examiner—Constantine Hannaher
(74) Attorney, Agent, or Firm—Fish & Richardson P.C.

(57) ABSTRACT

A PET scanner includes a first module processor for detecting a first event occurring at a first detector module and a plurality of remaining module processors, each of which is configured for detecting a second event occurring at a corresponding remaining detector module. The plurality of remaining module processors is divided into first and second subsets. The module processors in the first subset are configured to receive, from the first module processor, a first signal indicating an occurrence of the first event. The module processors in the second subset are configured to provide, to the first module processor, a second signal indicating an occurrence of the second event.

20 Claims, 5 Drawing Sheets

DISTRIBUTED COINCIDENCE PROCESSOR

FIELD OF INVENTION

This invention relates to positron emission tomography ("PET") systems, and in particular, to data acquisition in a PET system.

BACKGROUND

In positron emission tomography ("PET"), a radioactive material is placed in the patient. In the process of radioactive decay, this material emits positrons. These positrons travel through the patient until they encounter electrons. When a positron and an electron meet, they annihilate each other. This results in emission of two gamma ray photons traveling in opposite directions. By detecting these gamma ray photons, one can infer the distribution of the radioactive material within the patient.

To detect the photons, the patient is placed along an axis of a ring of detector modules. Each detector module includes detectors that generates an electrical signal when illuminated by a gamma ray photon. This signal is referred to as an event. A processor associated with each module creates an event data packet by compressing information about the event. This event data packet, together with many other event data packets from other modules, is funneled toward a central coincidence processor.

The coincidence processor, which receives event data packets from all detectors on the ring, processes that data. On the basis of the location of the detectors that detected a pair of events and the times of those events, the coincidence processor determines whether that pair of events resulted from an annihilation of a positron and electron within the patient. The coincidence processor then saves the compressed information about each event for later use by an image reconstruction process.

SUMMARY

In one aspect according to the invention, a PET scanner includes first and second detector modules for detecting respective first and second events. Each detector module is in communication with corresponding first and second module processors. The first module processor is configured to receive, from the second module processor, a signal indicating the occurrence of the second event, and to provide, to a third module processor, a signal indicating occurrence of the first event.

Embodiments of this aspect of the invention may include one or more of the following features.

The first module processor is configured to determine whether the first and second events define a coincidence. The first module processor is configured to determine whether the detected first event and the received signal, which indicates the second event, define a coincidence.

The first module processor is configured to transmit a request signal to the second module processor when the first module processor considers the first and second events to define a coincidence. In this case, the second module processor is configured to respond to the request signal by transmitting, to the first module processor, additional information about the second event.

The second module processor is configured to send to the first module processor, following detection of the second event, additional information about the second event.

The configuration of module processors can be based on the geometric relationships between detector modules associated with those module processors. For example, in one embodiment, the second and third module processors are selected such that the first detector module and a detector module corresponding to one of the second and third module processors define a field of view that includes a volume into which a patient is to be placed. Or, the first module processor and one of the second and third module processors can be selected such that the first module processor and a detector module corresponding to one of the second and third module processors are opposed to each other on a ring of detector modules.

More than one module processor is designated as a third module processor. The first module processor is configured to provide, to each of a plurality of third module processors, a signal indicating the occurrence of the first event.

More than one module processor is designated as a second module processor. The first module processor is configured to receive, from any one of a plurality of the second module processors, a signal indicating occurrence of the second event at a second detector module associated with that second module processor.

According to another aspect of the the invention, a PET scanner includes a first module processor for detecting a first event occurring at a first detector module and a plurality of remaining module processors, each of which is configured for detecting a second event occurring at a corresponding remaining detector module. The plurality of remaining module processors is divided into first and second subsets. The module processors in the first subset are configured to receive, from the first module processor, a first signal indicating an occurrence of the first event. The module processors in the second subset are configured to provide, to the first module processor, a second signal indicating an occurrence of the second event.

Embodiments of this aspect of the invention may include on or more of the following features.

A coincidence process executes on the first module processor. The coincidence process determines whether the first and second events define a coincidence.

The first module processor is configured to transmit a request signal to a remaining module processor from the second subset. The second subset of remaining module processors includes a selected remaining module processor configured to respond to the request signal by providing additional information about the second event.

The second subset of remaining module processors includes a selected remaining module processor configured to provide additional information about the second event in the absence of a request signal from the first module processor.

The designation of module processors into first and second subsets can depend on the geometric relationship between detector modules associated with those module processors. For example, at least one of the first and second subsets can include a remaining module processor for detecting an event at a detector module that, together with the first detector module, defines a field of view that includes a volume to be occupied by a portion of a patient. Or, at least one of the first subset of remaining module processors can include a remaining module processor for detecting an event at a detector module that is opposed to the first detector module.

According to another aspect of the invention, a method for detecting a coincidence includes collecting, at a first detector module, first information about a first event occurring at the first detector module; collecting, at each of a plurality of remaining module processors second information about a second event occurring at a corresponding remaining detector module; providing, to each remaining module processor from a first subset of the remaining module processors, a first signal indicating an occurrence of the first event, and receiving, from each remaining module processor from a second subset of the remaining module processors, a second signal indicating an occurrence of the second event.

In a PET scanner according to the invention, each module processor acts as both a master and a slave. As a master, each module processor considers events detected at only a few of the available detector modules. This distributed architecture means that each module processor will, when searching for event pairs that form a coincidence, process only a fraction of the total number of events detected at all module processors. Nevertheless, the module processors collectively consider events detected at all the detector modules.

In addition, the procedure for identifying such event pairs does not need to consider the location of the module detector at which an event occurred. Because the master processor only receives event information from selected slave processors, events presented to the master processor for consideration can be pre-qualified by properly selecting the slave processors.

The distributed architecture of the invention also reduces the likelihood that data traffic will be in excess of what the available data links can carry. Because each master is in communication with only a limited number of slaves, there is no need to funnel all data into a single centralized processor. This limits competition for a data link of limited bandwidth.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

Figure 1:
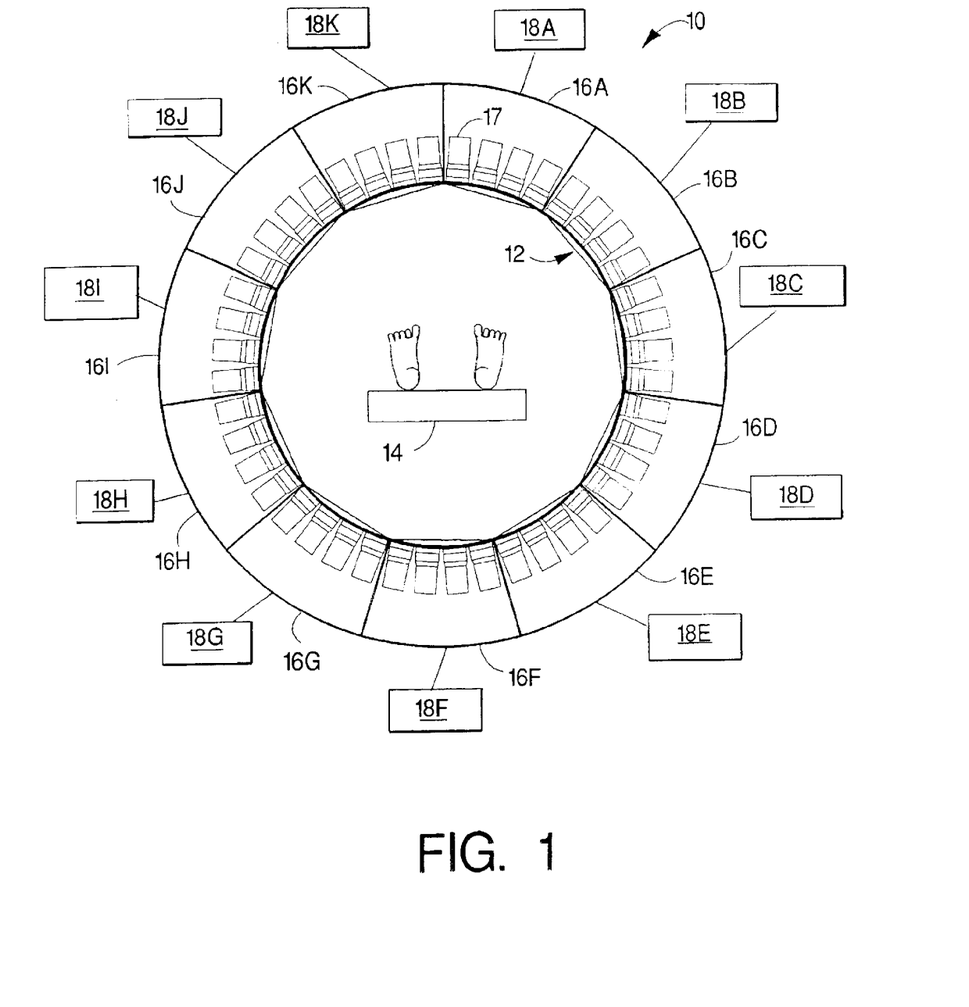
FIG. 1 shows a ring of modules.

Referring to FIG. 1, a PET scanner 10 includes a ring 12 of detector modules 16A–K surrounding a bed 14 on which a patient is to lie. Each detector module 16A–K (hereinafter referred to as a "module") includes several detector blocks 17. A detector block 17 typically includes four photo-multiplier tubes in optical communication with a scintillating crystal. The details of the construction of the photo-multiplier tubes and the scintillating crystal are not crucial to an appreciation of the invention and are therefore omitted for clarity.

A scintillating crystal is one that, when illuminated by a gamma ray, briefly generates visible light. This visible light is detected by the photo-multiplier tubes, which in turn generate an electrical signal indicative of detection of an incident gamma ray photon, hereafter referred to as detection of an "event."

To image a portion of a patient with a PET scanner 10, one introduces a radioactive material into the patient. As it decays, the radioactive material emits positrons. A positron, after traveling a short distance through the patient, usually encounters an electron. The resulting annihilation of the positron and the electron generates two gamma ray photons traveling in opposite directions. To the extent that neither of these photons is deflected or absorbed within the patient, they emerge from the patient and strike two of the detector modules 16A–K.

In particular, when one of these photons strikes a first detector module 16A, the other photon strikes a second detector module 16E, F, G, or H that is opposed to the first detector module. This results in two events: one at the first detector module 16A and the other at the opposed second detector module 16E, F, G, or H. Each of these events indicates the detection of a gamma ray photon. If these two events are detected at the first detector module 16A and the second detector module 16E, F, G, or H at the same time, it is likely that they indicate an annihilation occurring at the midpoint of a line connecting first detector module 16A and the second detector module 16E, F, G, or H. If these two events are detected at the first detector module 16A and the second detector module 16E, F, G, or H at almost the same time, it is likely that they indicate an annihilation occurring near the midpoint of a line connecting first detector module 16A and the second detector module 16E, F, G, or H.

It is apparent that what is of interest in a PET scanner 10 are pairs of events detected by opposed detector modules 16A, 16E–F at, or almost at, the same time. A pair of events having these properties is referred to as a "coincidence." In the course of a PET scan, each detector module 16A–K detects a large number of events. However, only a limited number of these events represent coincidences. The invention relates to a way to efficiently sift through the events to identify those event pairs representative of coincidences.

Associated with each detector module 16A–K is a module processor 18A–K that responds to events detected by its associated detector module 16A–K. A module processor 18A–K includes a processing element and a memory element in data communication with each other. The processing element includes an arithmetic logic unit ("ALU") containing combinatorial logic elements for performing various logical operations, an instruction register, associated data registers, and a clock. During each clock interval, the processor fetches an instruction from the memory element and loads it into the instruction register. Data upon which the instruction is to operate is likewise loaded into the associated data registers. At subsequent clock intervals, the processing element executes that instruction. A sequence of such instructions is referred to herein as a "process."

Each module processor 18A–K executes a master process and a slave process concurrently. Each module processor 18A–K is simultaneously a master of two module processors and a slave to two other module processors. As used herein, "master" shall mean a module processor 18A–K acting as a master module processor and "slave" shall mean a module processor 18A–K acting as a slave module processor. The terms "master module" and "slave module" shall be used to refer to the detector modules 16A–K associated with the master and slave respectively.

The two slaves of each master are selected on the basis of the relative locations of their associated detector modules 16A–K on the ring 12. In particular, the slaves of each master are selected to maximize the likelihood that an event detected at the master detector module and an event detected at any one of the slave detector modules form a coincidence pair.

For the configuration of eleven detector modules shown in FIG. 1, the master/slave relationship between module processors 18A–K is as follows:

| MASTER | SLAVE_1 | SLAVE_2 |
|---|---|---|
| 18A | 18E | 18F |
| 18B | 18F | 18G |
| 18C | 18G | 18H |
| 18D | 18H | 18I |
| 18E | 18I | 18J |
| 18F | 18J | 18K |
| 18G | 18K | 18A |
| 18H | 18A | 18B |
| 18I | 18B | 18C |
| 18J | 18C | 18D |
| 18K | 18D | 18E | and the slave/master relationship between module processors 18A–K is as follows:

| SLAVE | MASTER_1 | MASTER_2 |
|---|---|---|
| 18A | 18G | 18H |
| 18B | 18H | 18I |
| 18C | 18I | 18J |
| 18D | 18J | 18K |
| 18E | 18K | 18A |
| 18F | 18A | 18B |
| 18G | 18B | 18C |
| 18H | 18C | 18D |
| 18I | 18D | 18E |
| 18J | 18E | 18F |
| 18K | 18F | 18G |

Figure 2:
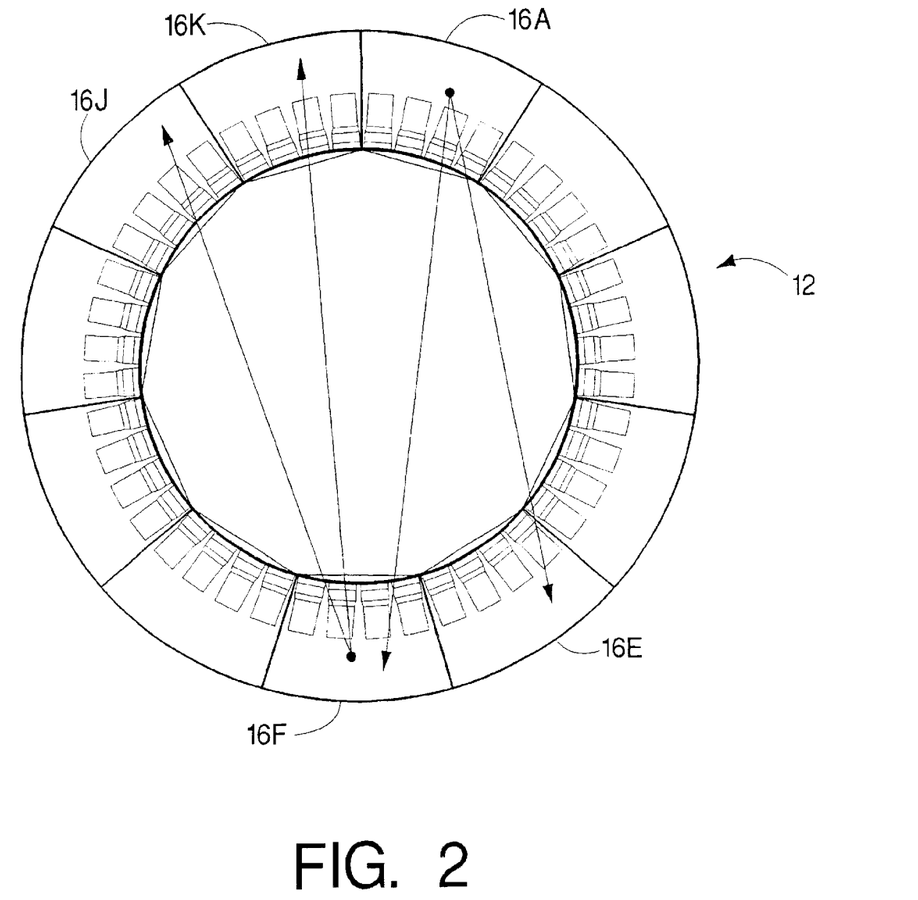
FIG. 2 shows master/slave relationships between a subset of the modules shown in FIG. 1.

FIG. 2 shows the ring 12 of FIG. 1 with lines added to show the master/slave relationships of two of the eleven module processors. The lines connecting detector modules 16A to 16E and detector modules 16A to 16F indicate that module processors 18E and 18F are slaves of module processor 18A. Module processor 18F has its own two slaves, as indicated by the lines connecting detector module 16F to detector modules 16J and 16K. The eighteen lines representing the remaining master/slave relationships are omitted for clarity.

Figure 3:
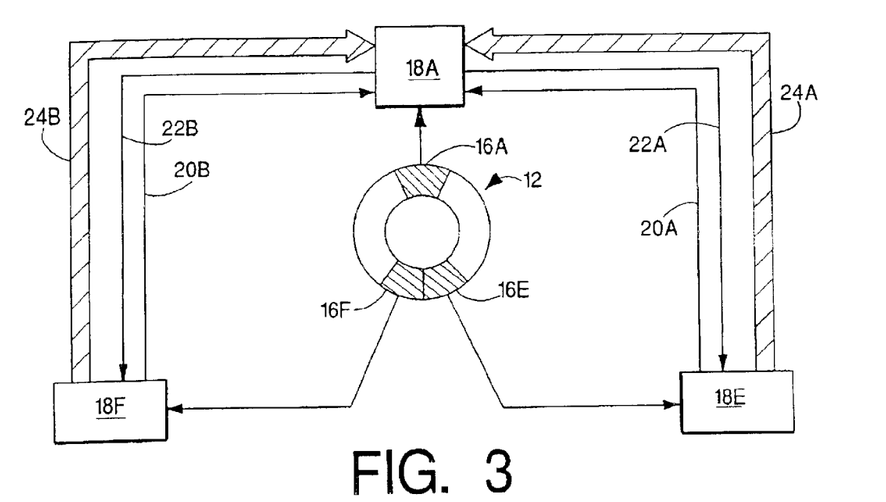
FIG. 3 shows connections between a master and its two slaves.

As shown in FIG. 3, a master 18A is connected to its first slave 18E by first and second data links 20A, 22A. Similarly, the master 18A is connected to its second slave 18F by additional first and second data links 20B, 22B. The first and second data links 20A–B, 22A–B are used to transmit trigger pulses between the master 18A and the corresponding slave 18E–F. Hence, the first and second data links 20A–B, 22A–B are typically a single wire.

When a slave 18E receives, from its associated detector module 16E, a signal indicative of an event (hereinafter referred to as a "slave event"), it transmits a pulse to the master 18A on the first data link 20A. When the master 18A considers a slave event detected by the slave 18E to be a constituent event of a coincidence, it sends a pulse back to that slave 18E on the second data link 22A.

A third data link 24A–B, which is typically an LVDS ("low-voltage differential standard") channel connects the master 18A and each of its slaves 18E–F. The slaves 18E–F use this third data link 24A–B to transmit to the master 18A additional information about slave events. Such additional information can include, for example, the energy of the incident photon that triggered that slave event, and the waveform of the voltage signal generated by the photo multiplier tube.

Figure 4:
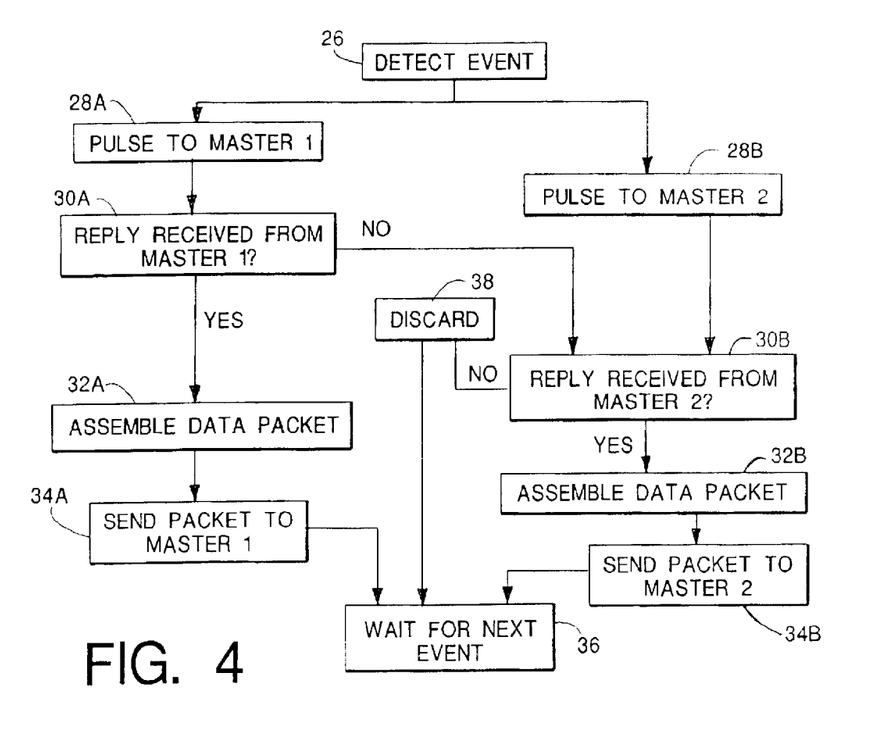
FIG. 4 is a flow-chart of a process carried out by a slave.

FIG. 4 shows the procedure carried out by a slave. Upon receiving, from its associated module processor, a signal indicative of a slave event (step 26), a slave reports the detection of that slave event to both of its respective masters (steps 28A–B). It does so by transmitting a pulse on each of two first data links that connect it to those masters. The slave then waits for a response from its masters on either of the two second data links connecting it to each of those two masters (steps 30A–B).

In response to a request pulse received on the second data link from a master, the slave prepares a data packet containing additional information about the slave event (steps 32A–B). This data packet is then transmitted on the third data link to whichever of its masters requested that additional information (steps 34A–B). After sending the data packet, the slave waits for the next event (step 36). If neither master sends a request pulse within a pre-defined time interval, the slave discards the slave event (step 38) and waits for the next slave event (step 36).

Figure 5:
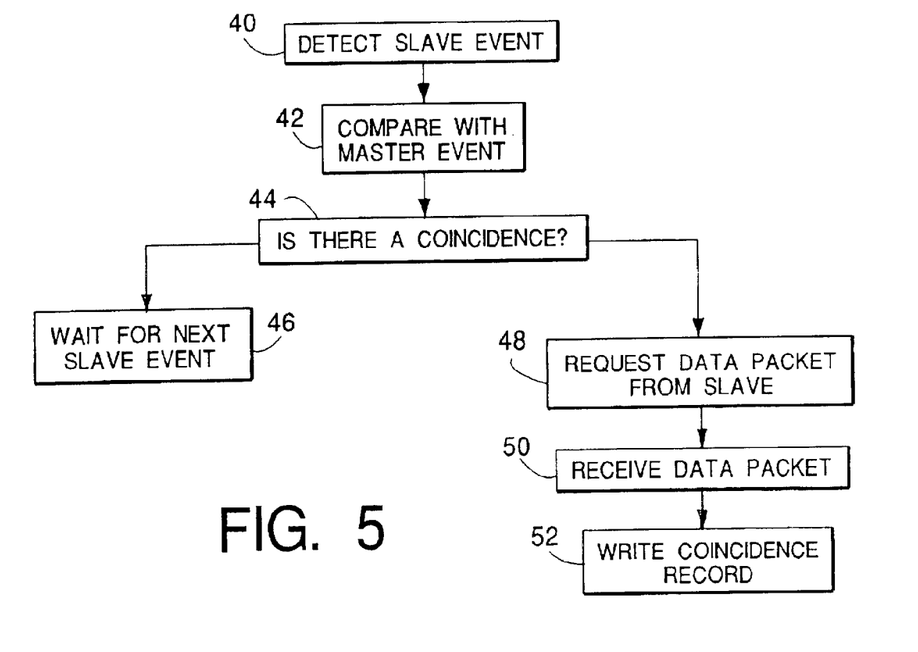
FIG. 5 is a flow-chart of a process carried out by a master.

FIG. 5 shows the procedure carried out by a master. Upon receiving, from its associated detector module, a signal indicative of a slave event (step 40), the master compares the occurrence time of that slave event with occurrence times of events (hereinafter referred to as "master events") received by its own associated detector module (step 42). If the occurrence times of a master event and a slave event differ by no more than a selected tolerance, the master considers that master event and that slave event to be a coincidence (step 44). Otherwise, the master ignores the slave event and waits for the next slave event (step 46). The tolerance is selected on the basis of the length of that portion of the line joining the master and slave detector modules that is expected to be within the patient. For example, for a patient whose girth is such that that portion extends 24 centimeters, a suitable tolerance is 80 nanoseconds.

Upon recognizing a coincidence between a master event and a slave event, the master transmits a request pulse to whichever slave detected that slave event (step 48). As described in connection with FIG. 4, this pulse is interpreted by the slave as a request for additional information about that slave event. The master then waits for the data packet containing additional information about the slave event.

Upon receiving the data packet (step 50), the master creates a coincidence record that includes information about the master event and the slave event that together make up the coincidence. This coincidence record is stored on a mass storage medium, such as a magnetic disk or a magnetic tape, (step 52) for later processing by an image-reconstruction process executing known tomography algorithms.

As described herein, each slave has two masters and each master has two slaves. However, there is no requirement that a slave have a particular number of masters or that a master have a particular number of slaves. Nor is there a requirement that each master have the same number of slaves or that each slave have the same number of masters.

The illustrated PET scanner 10 has eleven detector modules. However, a different number of detector modules can be used. The invention does not depend on the number of detector modules in the ring 12. It is topologically convenient, however, to have an odd number of detector modules.

In FIG. 4, the slave notifies the master of an event but withholds the information about the event until the master actually requests that information. This minimizes the probability that the third data link will be busy ferrying data packets from the slave to the master, thereby minimizing the probability that a data packet will be dropped. However, it also imposes some additional complexity since the master must now request data packets of interest.

Alternatively, the slave sends the master a data packet for each event detected at that slave's associated detector module. If the master does not consider the event to be part of a coincidence, it simply discards the data packet. This eliminates the need for the second data link since the master no longer has to signal the slave to send a data packet.

Having described the invention, and a preferred embodiment thereof, what we claim as new and secured by Letters Patent is:

We claim:

1. A PET scanner comprising:
    a first detector module for detecting a first event;
    a second detector module for detecting a second event;
    a first module processor in communication with the first detector module;
    a second module processor in communication with the second detector module; and
    a third module processor;
    the first module processor being configured to
        receive, from the second module processor, a signal indicating the occurrence of the second event, and to
        provide, to the third module processor, a signal indicating occurrence of the first event.

2. The PET scanner of claim 1, wherein the first module processor is configured to determine whether the first and second events define a coincidence.

3. The PET scanner of claim 2, wherein
    the first module processor is configured to transmit a request signal to the second module processor when the first module processor considers the first and second events to define a coincidence, and
    the second module processor is configured to respond to the request signal by transmitting, to the first module processor, additional information about the second event.

4. The PET scanner of claim 1, wherein the first module processor is configured to determine whether the detected first event and the received signal indicating the second event define a coincidence.

5. The PET scanner of claim 1, wherein the second module processor is configured to send to the first module processor, following detection of the second event, additional information about the second event.

6. The PET scanner of claim 1, wherein the first module processor and one of the second and third module processors are selected such that the first detector module and a detector module corresponding to one of the second and third module processors define a field of view that includes a volume into which a patient is to be placed.

7. The PET scanner of claim 1, wherein the first module processor and one of the second and third module processors is selected such that the first module processor and a detector module corresponding to the one of the second and third module processors are opposed to each other on a ring of detector modules.

8. The PET scanner of claim 1, further comprising a plurality of third module processors, wherein the first module processor is configured to provide, to each of the plurality of third module processors, a signal indicating the occurrence of the first event.

9. The PET scanner of claim 1, further comprising a plurality of second module processors, wherein the first module processor is configured to receive, from any one of the plurality of the second module processors, a signal indicating occurrence of the second event at a second detector module associated with that second module processor.

10. A PET scanner comprising:
    a first module processor for detecting a first event occurring at a first detector module;
    a plurality of remaining module processors, each of which is configured for detecting a second event occurring at a corresponding remaining detector module, the plurality of remaining module processors including
        a first subset of remaining module processors, each of which is configured to receive, from the first module processor, a first signal indicating an occurrence of the first event, and
        a second subset of remaining module processors, each of which is configured to provide, to the first module processor, a second signal indicating an occurrence of the second event.

11. The PET scanner of claim 10, wherein
    the first module processor is configured to transmit a request signal to a remaining module processor from the second subset; and
    the second subset of remaining module processors comprises a selected remaining module processor configured to respond to the request signal by providing additional information about the second event.

12. The PET scanner of claim 10, wherein the second subset of remaining module processors comprises a selected remaining module processor configured to provide additional information about the second event in the absence of a request signal from the first module processor.

13. The PET scanner of claim 10, wherein at least one of the first and second subsets comprises a remaining module processor for detecting an event at a detector module that, together with the first detector module, defines a field of view that includes a volume to be occupied by a portion of a patient.

14. The PET scanner of claim 10, wherein at least one of the first subset of remaining module processors comprises a remaining module processor for detecting an event at a detector module that is opposed to the first detector module.

15. A method for detecting a coincidence, the method comprising:
    collecting, at a first detector module, first information about a first event occurring at the first detector module;
    collecting, at each of a plurality of remaining module processors second information about a second event occurring at a corresponding remaining detector module;
    providing, to each remaining module processor from a first subset of the remaining module processors, a first signal indicating an occurrence of the first event, and
    receiving, from each remaining module processor from a second subset of the remaining module processors, a second signal indicating an occurrence of the second event.

16. The method of claim 15, further comprising executing a coincidence process on the first module processor for determining whether the first and second events define a coincidence.

17. The method of claim 15, further comprising:
  providing a request signal to a remaining module processor from the second subset of the remaining module processors;
  receiving, in response to the request signal, additional information about the second event from the remaining module processor.

18. The method of claim 15, further comprising receiving additional information about the second event from the remaining module processor from the second subset of remaining module processors in the absence of a request signal from the first module processor.

19. The method of claim 15, further comprising selecting a remaining module processor from at least one of the first and second subsets to correspond to a detector module that, together with the first detector module, defines a field of view that includes a volume that a portion of a patient is to occupy.

20. The method of claim 15, further comprising selecting a remaining module processor from at least one of the first and second subsets to correspond to a detector module that is opposed to the first detector module.

* * * * *

UNITED STATES PATENT AND TRADEMARK OFFICE
CERTIFICATE OF CORRECTION

PATENT NO. : 6,828,564 B2 Page 1 of 1
APPLICATION NO. : 10/190741
DATED : December 7, 2004
INVENTOR(S) : William A. Worstell

It is certified that error appears in the above-identified patent and that said Letters Patent is hereby corrected as shown below:

In col. 7, beginning at line 59, please replace claim 7 with the following corrected version:

7. The PET scanner of claim 1, wherein the first module processor and one of the second and third module processors is selected such that the first <u>detector</u> module [[processor]] and a detector module corresponding to the one of the second and third module processors are opposed to each other on a ring of detector modules.

Signed and Sealed this

Thirty-first Day of March, 2009

JOHN DOLL
*Acting Director of the United States Patent and Trademark Office*